Figure 1:
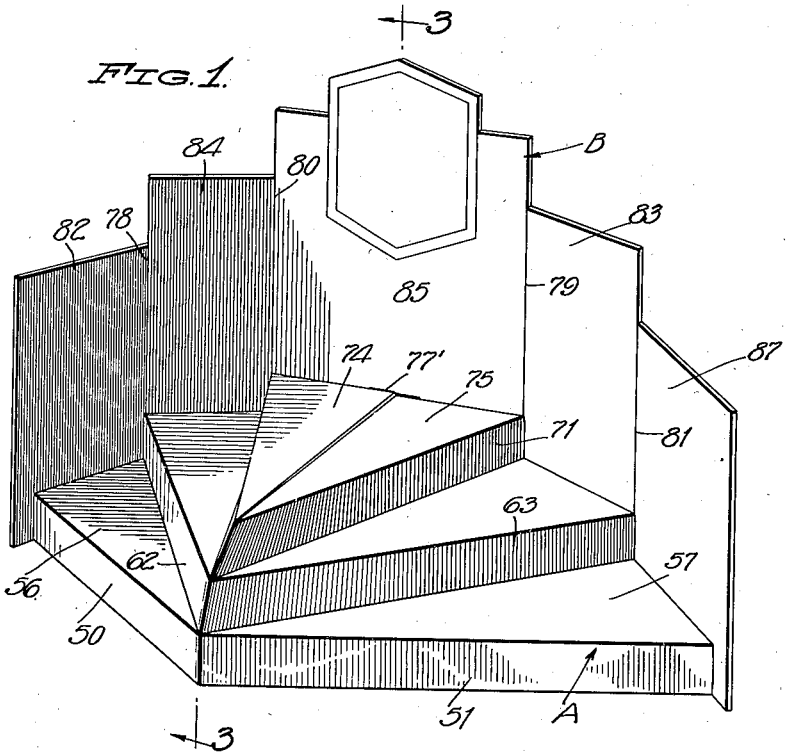

Nov. 11, 1941.  R. E. PAIGE  2,262,646
DISPLAY DEVICE
Filed July 7, 1938  5 Sheets-Sheet 1

RICHARD E. PAIGE.
INVENTOR

Nov. 11, 1941.   R. E. PAIGE   2,262,646
DISPLAY DEVICE
Filed July 7, 1938   5 Sheets-Sheet 2
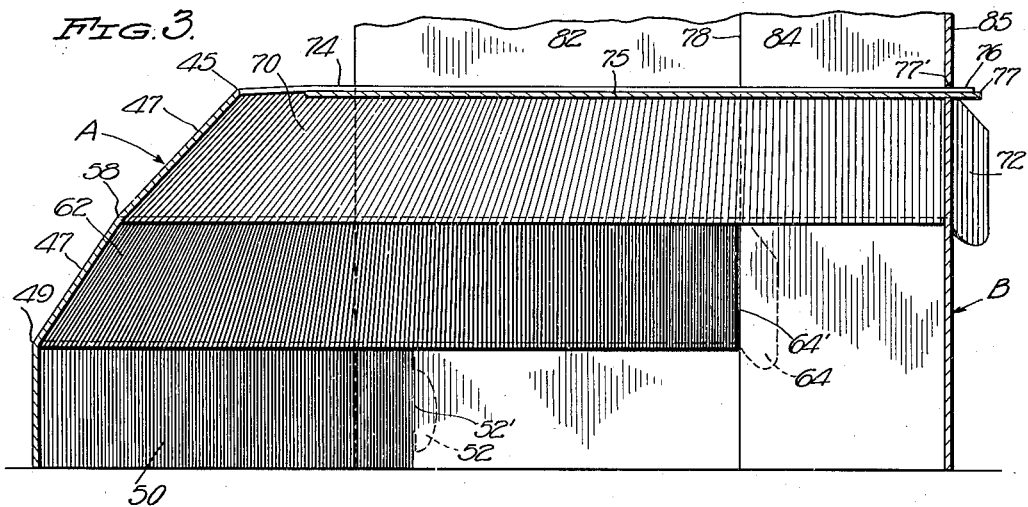
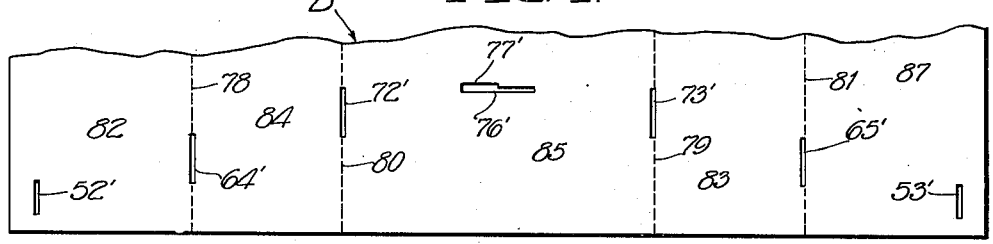
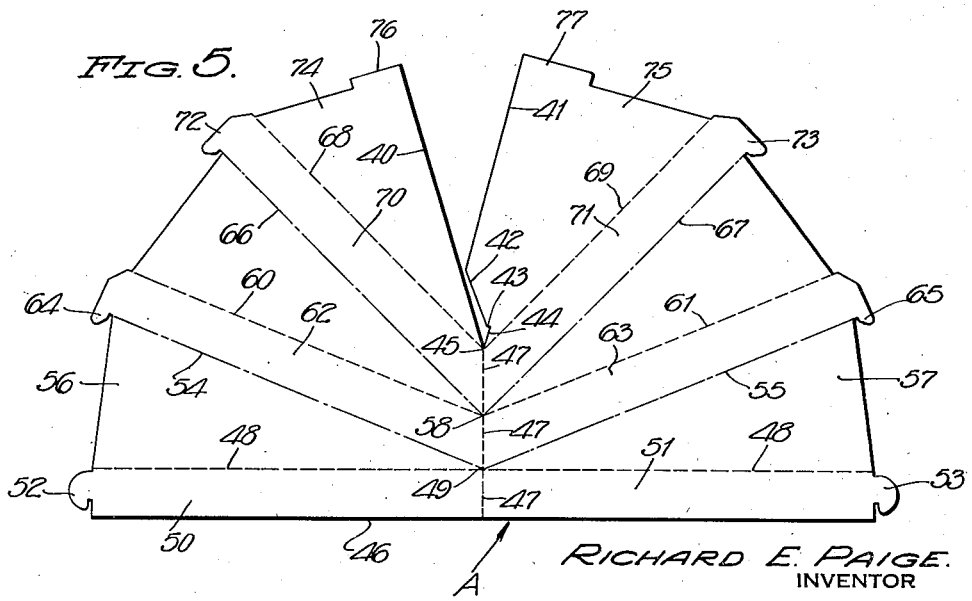
RICHARD E. PAIGE.
INVENTOR Nov. 11, 1941.  R. E. PAIGE  2,262,646
DISPLAY DEVICE
Filed July 7, 1938  5 Sheets-Sheet 3
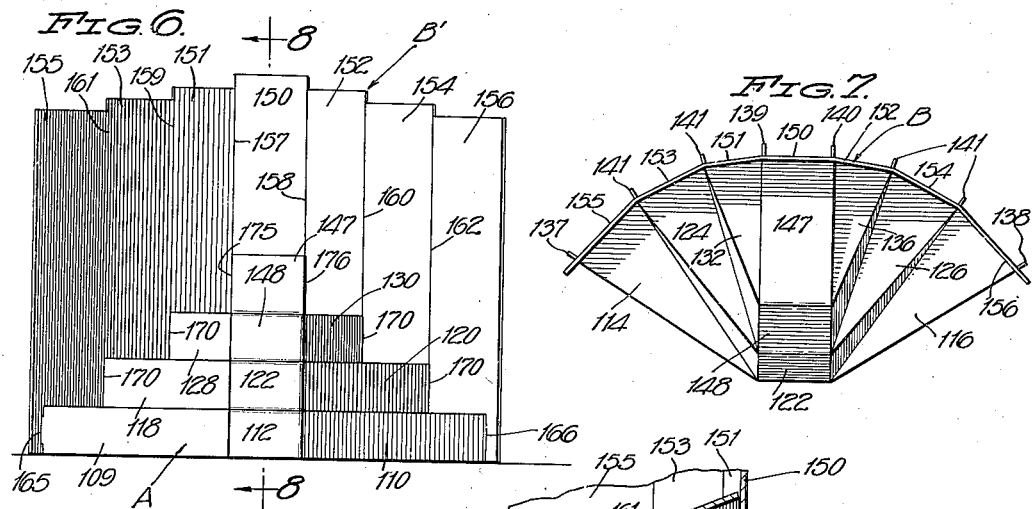
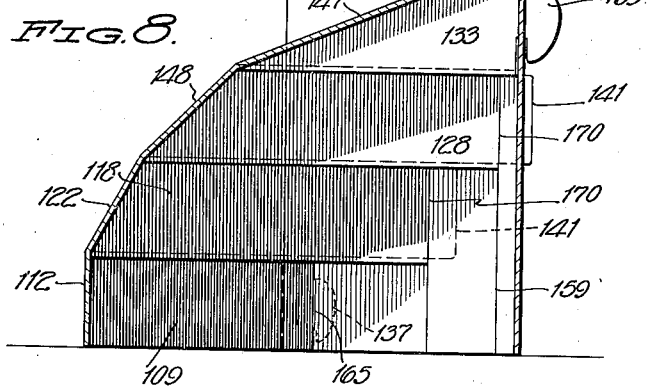
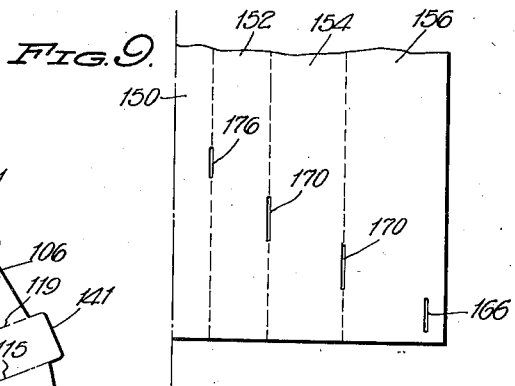
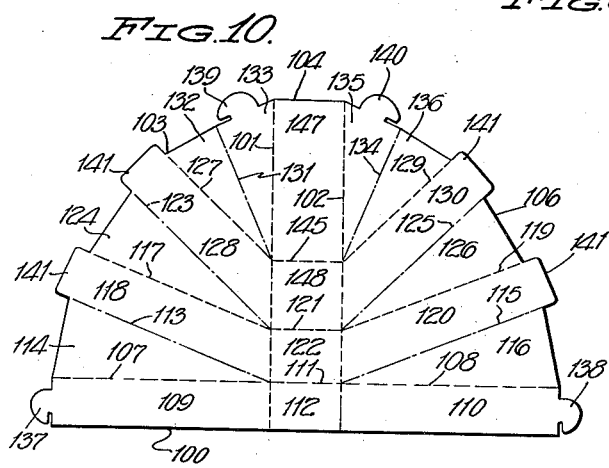
RICHARD E. PAIGE.
INVENTOR
BY
Ely Pattison
ATTORNEYS Nov. 11, 1941.   R. E. PAIGE   2,262,646
DISPLAY DEVICE
Filed July 7, 1938   5 Sheets-Sheet 4
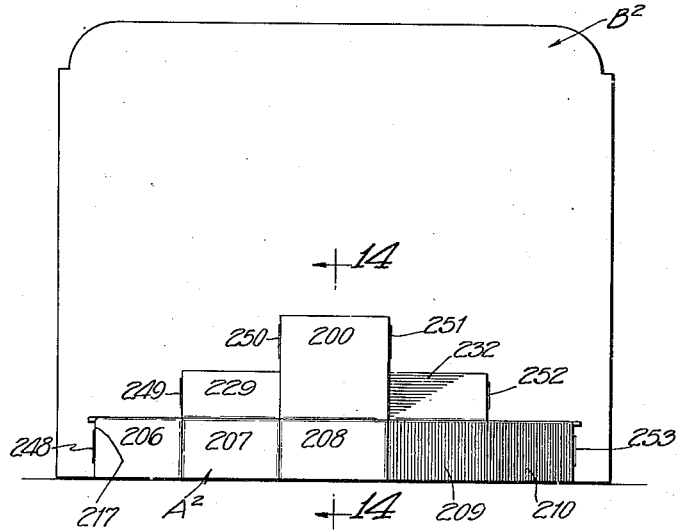
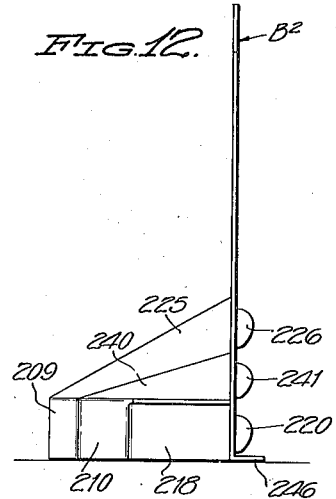
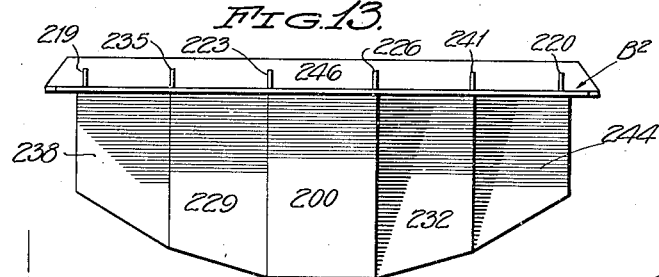
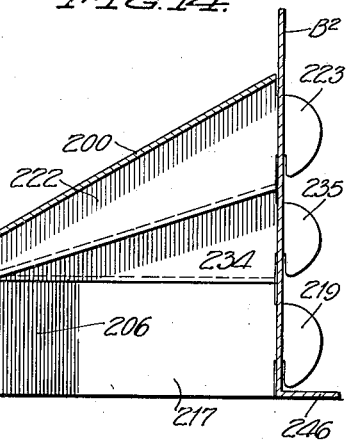
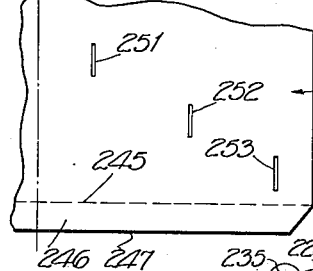
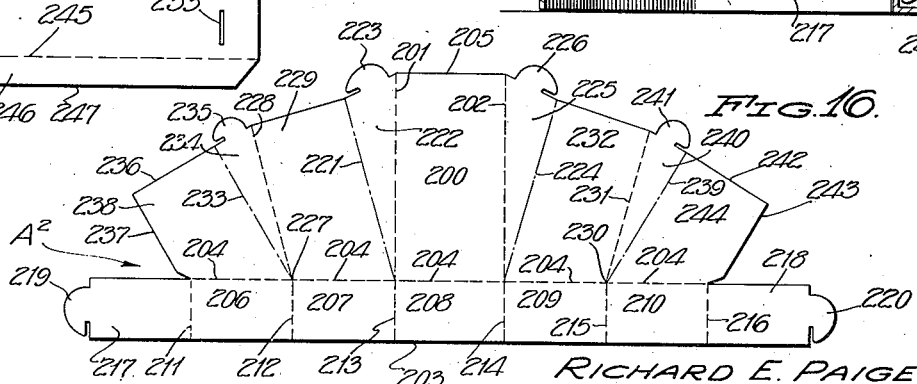
RICHARD E. PAIGE.
INVENTOR
BY Ely V Pattison
ATTORNEYS.
WITNESS:

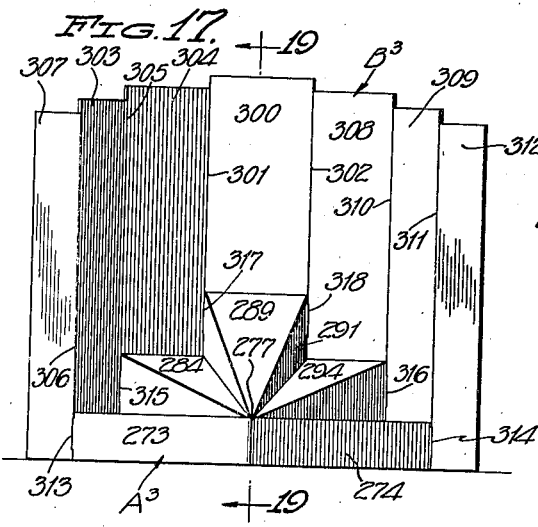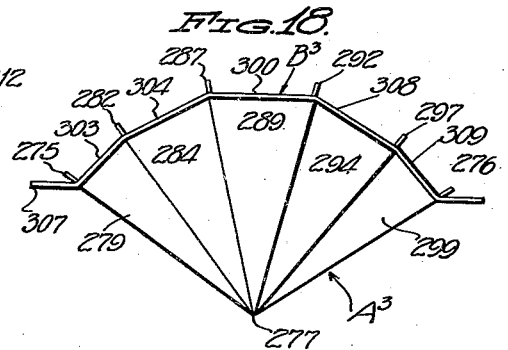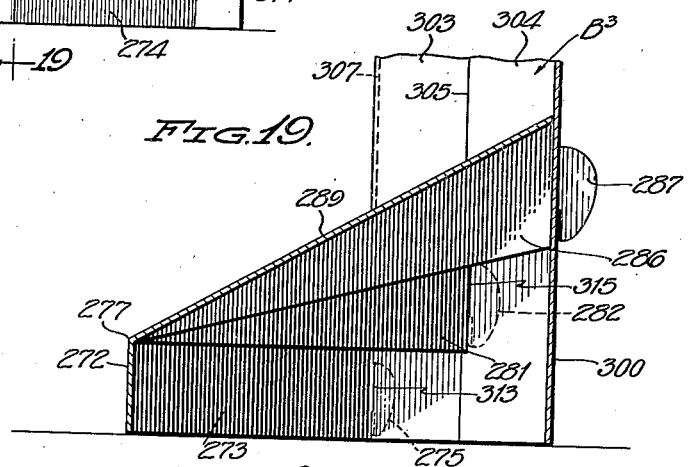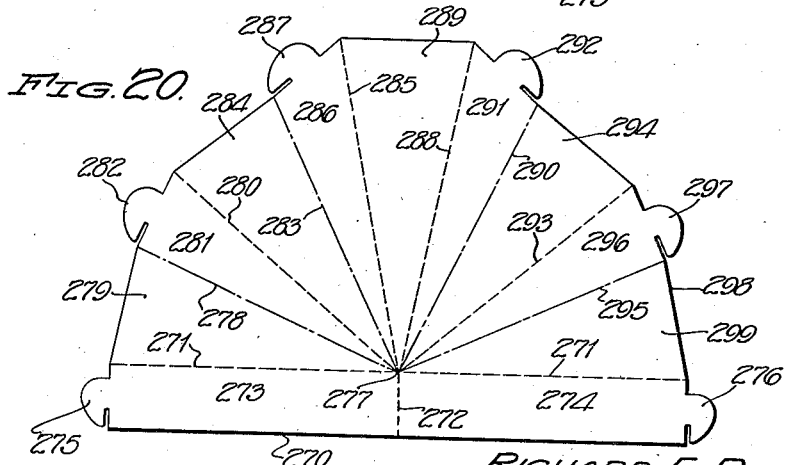

Patented Nov. 11, 1941

2,262,646

UNITED STATES PATENT OFFICE 2,262,646

DISPLAY DEVICE

Richard Eaton Paige, Flushing, N. Y.

Application July 7, 1938, Serial No. 217,893

14 Claims. (Cl. 211—135)

The present invention relates to new and useful improvements in display devices and more particularly it pertains to display devices of the type constructed from cardboard, paper or other foldable material which may be creased or scored along lines upon which the material may be bent or hinged to set-up the device or to collapse it to a flat knocked-down position.

One object of the present invention is to improve the construction of display devices of the afore-mentioned type and particularly of the type of display devices, which in their set-up position, present a plurality of supporting surfaces in different stepped planes.

It is another object of the invention to provide a display device which will produce new ornamental forms and which can be produced at a relatively lower cost of manufacture than is possible with display devices of this type as generally constructed.

Another object of the invention resides in a novel construction whereby the finished display will present an even and uninterrupted surface having no openings or apertures therein, a disadvantage in stepped display as generally constructed.

I am aware that it is not new to provide display devices which in their set-up or operative position present a number of supporting surfaces or shelves in different stepped planes. However, such devices with which I am familiar, are constructed from several elements secured together by adhesives, tacking or other means and which, when once constructed, are not capable of folding to a flat knocked-down condition without damage to the device.

Furthermore, such displays as generally constructed require considerable handling and manual work in their construction which necessarily adds to their cost of manufacture thereby rendering them prohibitive of use for general purposes.

A feature of the present invention resides in a novel constructionn whereby I obtain a display device which in its erected display form, presents a plurality of stepped shelves or supporting surfaces, which is constructed from a minimum number of elements.

A further feature of the invention resides in the provision of a display device of the character which presents a plurality of stepped shelves or supporting surfaces and which can be erected in display position, or knocked-down from its display position to flat form for shipping or storing purposes, at will without damage to the device and without rendering it incapable of future use.

Still a further feature of the invention resides in a new and novel construction whereby the element or portion of the display device which constitutes the article supporting element and which presents a plurality of stepped shelves or supporting surfaces, is formed from a single flat blank of foldable material which is creased or scored in such a manner as to be capable of folding to the form desired as distinguished from those devices of the prior art wherein such elements are constructed from many pieces of material so secured together as to be incapable of such folding and which, therefore, constitute a permanent structure once they are set-up.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention in several of the forms in which it has been actually embodied and the following detailed description of the several constructions therein shown.

Figure 2:
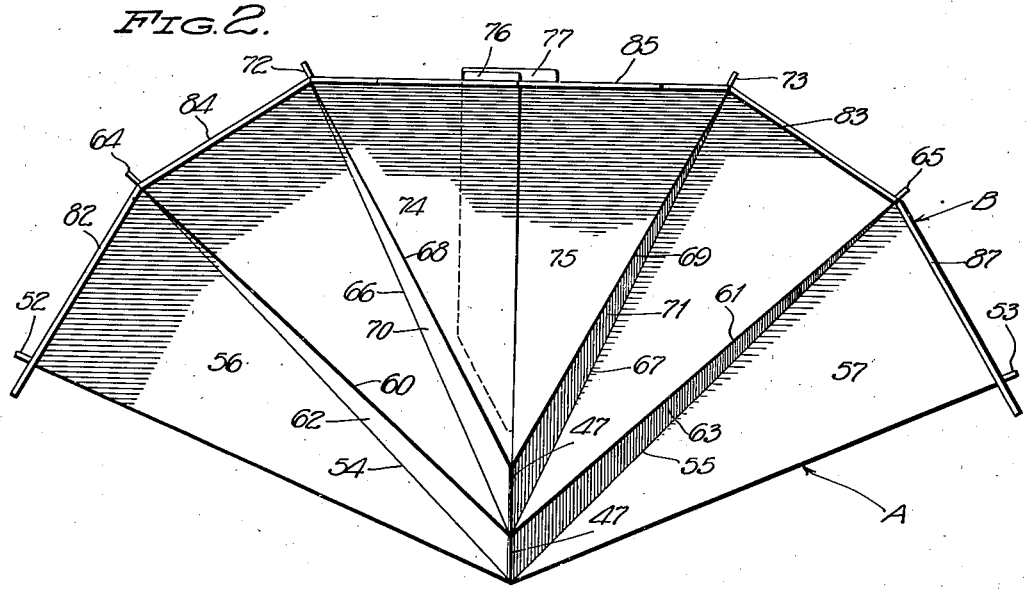

In the drawings:

Figure 1 is a front perspective view illustrating one embodiment of my invention, Figure 2 is a top plan view of the device illustrated in Figure 1, Figure 3 is a vertical sectional view with a portion of the device broken away, the view being taken substantially on the line 3—3 of Figure 1, Figure 4 is a fragmentary detail view of one of the elements of my device, Figure 5 is a plan view of a blank of material from which one of the elements of my device is constructed, the view illustrating the manner in which the blank of material is cut and scored, Figure 6 is a front perspective view illustrating a modified form of my invention, the view being taken upon a reduced scale, Figure 7 is a top plan view of the form illustrated in Figure 6, Figure 8 is a vertical sectional view on a slightly enlarged scale with a portion of the device broken away, the view being taken substantially on the line 8—8 of Figure 6, Figure 9 is a fragmentary detail view of one of the elements of the device as illustrated in Figures 6 to 10, inclusive, Figure 10 is a plan view of a blank of material from which one of the elements of the device illustrated in Figures 6 to 10 inclusive is constructed, the figure illustrating the manner in which the blank is cut and scored, Figure 11 is a view in front elevation, illustrating a still further modified form of my invention, Figure 12 is a view in side elevation of that form of my invention illustrated in Figures 11 to 16 inclusive, Figure 13 is a top plan view of this last mentioned form of my invention, Figure 14 is a fragmentary vertical sectional view taken substantially on the line 14—14 of Figure 11, Figure 15 is a fragmentary detail view of one of the elements of the device as illustrated in Figures 11 to 16 inclusive, Figure 16 is a plan view of a blank of material from which one of the elements of the device illustrated in Figures 11 to 16 inclusive is constructed, the figure illustrating the manner in which the blank is cut and scored, Figure 17 is a view in front elevation illustrating a still further modified form of the invention, Figure 18 is a top plan view of that form illustrated in Figure 17, Figure 19 is a fragmentary vertical sectional view on an enlarged scale, the view being taken substantially on the line 19—19 of Figure 17, Figure 20 is a plan view of a blank of material from which one of the elements of the device illustrated in Figures 17 to 20 inclusive, is constructed, illustrating the manner in which the blank is cut and scored.

Referring to the drawings by reference character and particularly to Figures 1 through 5, inclusive, it will be noted that my improved display device in this form consists of two elements A and B.

The element A forms the article supporting element, while the element B, serves to maintain the element A in set-up or display position and in addition, provides an ornamental background for the element A.

Referring to Figure 5 of the drawings, the blank from which the element A is formed is substantially fan shaped and extending inwardly from the outer edge thereof, there is a cut-away portion defined by the edges or lines of cut, 40, 41, 42, 43 and 44. The edges 40 and 44 meet each other at the point 45 which is located substantially in the central portion of the blank.

The blank has a straight edge 46 and extending inwardly of the blank from a point centrally between the ends of this straight edge 46 of the blank and terminating at its inner end at the point 45, there is a front cut score line 47.

Extending from one side to the other of the blank in parallelism with the straight edge 46 of the blank, there is a front cut score line 48 which intersects the score line 47 at 49. The score line 47 together with the score line 48, form two rectangular panels 50 and 51 upon the outer end of each of which there is provided a locking tongue, these locking tongues being designated respectively 52 and 53.

Extending diagonally through the blank in diverging directions from the point 49, there are two rear cut score lines 54 and 55 which extend to their respective side edges of the blank. These score lines combined with the score line 48, form two triangular panels 56 and 57 which lie upon opposite sides of the score line 47.

Extending in diverging directions from a point 58 upon the score line 47, there are two front cut score lines 60 and 61. The score line 60 extends parallel with the score line 54, the score line 61 extending parallel with the score line 55 and these score lines together with an intermediate section of the score line 47, form two diagonally extending trapezoidal panels 62 and 63. Upon the outer end of the panel 62, there is a locking tongue 64, a similar locking tongue 65 being provided upon the outer end of the panel 63.

Extending diagonally through the blank in diverging directions from the point 58, there are two rear cut score lines 66 and 67 which extend from the point 58, to their respective side edges of the blank. These score lines together with their respective score lines 60 and 61, form two triangular panels which lie upon opposite sides of the score line 47.

Extending diagonally in diverging directions from the termination 45 of the score line 47, there are two front score lines 68 and 69. The score line 68 extends parallel with the score line 66 and together therewith and with the inner end section of the score line 47, forms a diagonally extending trapezoidal panel 70. The score line 69 extends parallel with the score line 67 and together therewith and with the inner end section of the score line 47, forms a diagonally extending panel 71. The panels 70 and 71 extend in diverging directions upon opposite sides of the score line 47. Upon the outer end of the panel 70, there is a locking tongue 72 and upon the outer end of the panel 71, there is a similar locking tongue 73.

The score line 68, together with the cut edge 40 of the blank forms a triangular panel 74, while the score line 69, together with the cut edges 41, 42, 43 and 44, forms a panel 75, which is substantially triangular in form. The panel 74 has upon its outer edges, a rectangular extension 76 while upon its outer edge, the panel 75 has an extension 77.

The element B may be of any desired ornamental form or contour as pertains to its outer edge except, that it is desirable to have its lower edge C, straight.

In the present embodiment of the invention, the blank is of general flat rectangular form and has a plurality of rear cut score lines extending throughout the distance between the two opposite edges which form the top and bottom edges of the element B when it is in its set-up or display position. These score lines are designated 78, 79, 80 and 81, the score lines 78 and 80 dividing the blank into two panels 82 and 84 disposed upon the left hand side of a central panel 85, the score lines 79 and 81 dividing the blank into two panels 83 and 87 disposed upon the right hand side of the center panel 85 in the drawings, the center panel being defined by the score lines 80 and 79.

In the panel 82, there is a vertically disposed relatively narrow cut-out portion 52' which receives the locking tongue 52 of the panel 50 and in the panel 87, there is a similar cut-out 53' which receives the locking tongue 53 of the panel 51 when the two elements A and B are set-up in display position.

In the edge of the panel 84 defined by the score line 78, there is, at a slightly higher level than the cutout 52', an elongated cut-out 64' and in the edge of the panel 83, defined by the score line 81, there is a similar cut-out 65'. At each side of the center panel 85 upon the score lines 80 and 79, respectively, there are two elongated cut-outs 72' and 73'. These cut-outs 72' and 73' are positioned slightly above, or in a higher plane than the cut-outs 64' and 65' heretofore mentioned. The center panel 85 is also formed or provided with a horizontally extending cut-out 76' which has an enlarged portion 77' and this cut-out is located substantially centrally of the panel 85 and at a level substantially level with the upper ends of the cut-outs 72' and 73'.

I will now describe the manner in which this form of the device is set-up for display purposes.

By reference to Figure 5 of the drawings, it will be apparent that the blank which forms the element A of the device is divided by the several score lines into two groups of panels, there being one group upon each side of the center of the blank as defined by the score line 47. Each group of panels consists of a plurality of alternately disposed trapezoidal and triangular panels which are hingedly connected together by the several score lines which form the adjoining edges of the said panels.

With the blank in its flat form in which it is illustrated in Figure 5, the two panels 74 and 75 are grasped and drawn towards each other until they assume an overlapping relation, in the present instance, with the panel 74 overlying the panel 75.

Drawing the panels together to overlapped relation circumflexes the blank causing it to bend upon the several score lines throwing the several triangular panels into stepped horizontal planes upon opposite sides of the score line 47, the trapezoidal panels assuming positions substantially in vertical planes and forming risers or supporting elements for the triangular panels which later provide shelves for receiving and displaying various articles of merchandise.

To retain the blank in its circumflexed condition, the several locking tongues 52, 53, 64, 65, 72 and 73, are engaged respectively with the cut-outs 52', 53', 64', 65', 72' and 73'. Also, the projections 76 and 77, pass into the cut-out 76' and provide means for supporting the rear ends of the overlying panels 74 and 75.

When the device is set-up, the panels 50 and 51 form support engaging means to support the device in display position.

When the blank is circumflexed, a slight distortion is set-up in each of the trapezoidal panels which form the risers, particularly at the forward portions thereof as illustrated in Figures 1 and 2 but in reality, and this is particularly true of the larger sizes, this distortion is so slight as to be hardly noticeable and in no way impairs the effectiveness of the display.

By examination of Figures 1 and 3, it will be clearly apparent that each of the panels recedes from a central forward line formed by the score line 47 and further, that this central line itself recedes from the point 49, the juncture of the score lines 47 and 48.

When the two elements A and B are interlocked in the display position, the element B forms an ornamental background for the element A, with the panels 82, 83, 84, 85 and 87 forming upstanding panels in continuation of their respective triangular panels in the element A.

In Figures 6 to 10 of the drawings is illustrated a modified form of the invention which form is of the same general type as heretofore described.

The device illustrated in these figures consists of two elements A' and B', which are detachably connected together in order that the device may be set-up and knocked-down at will. In its set-up position, the element A' presents a plurality of article supporting shelves arranged in stepped planes, the element B' retaining the element in set-up position and forming a background therefor.

Referring to Figure 10 of the drawings, the element A' is formed from a single blank of material, which blank is substantially semi-elliptical in form.

The blank has a straight edge 100 and extending through the blank at substantially right angles to said straight edge, there are two front cut score lines 101 and 102. The score lines 101 and 102 divide the blank into a center section 104, and two side sections 103 and 106, the score lines 101 and 102 defining the center section 104 from which the several article supporting shelves recede.

Extending from the score line 101 through the side section 103, there is a front cut score line 107 which together with the score line 101 and the left side section of the straight edge 100, provides a rectangular panel 109. Extending from the score line 102 through the side section 106, there is a front cut score line 108 and this score line together with the right side section of the straight edge 100, provides a rectangular panel 110.

Extending through the center section 104 and connecting the score lines 107 and 108, there is a front cut score line 111 which together with the score lines 101 and 102, provides a panel 112 in the center section 104. The score lines 107, 108 and 111 extend parallel with the straight edge 100 of the blank.

Extending diagonally through the side section 103 of the blank from the point where the score lines 101 and 107 join, there is a rear cut score line 113 which together with the score line 107 provides a triangular panel 114. A similar rear cut score line 115 extends diagonally from the juncture of the score lines 102 and 108 through the side section 106 and this score line together with the score line 108, forms a triangular panel 116.

Extending diagonally through the side section 103 in parallelism with the score line 113, there is a front cut score line 117 which together with the score line 113, forms a trapezoidal panel 118 and extending through the side section 106 in parallelism with the score line 115, there is a front cut score line 119 which together with the said score line 115 forms a diagonally extending trapezoidal panel 120. Connecting the score lines 117 and 119 and extending through the center section 104 in parallelism with the score line 111, there is a score line 121 which together with the score line 111 provides a panel 122 in the center section.

Extending through the side section 103 diagonally with respect to the score line 117, from the point where the score line 117 joins the score line 101, there is a rear cut score line 123 which together with the score line 117, forms a triangular panel 124.

Extending through the side section 106 diagonally with respect to the score line 119 from the point where the score line 119 joins the score line 102, there is a rear cut score line 125 which together with the score line 119, forms a triangular panel 126.

A front cut score line 127 extends diagonally through the side section 103 in parallelism with the score line 123 and together with said score line 123, forms a diagonally extending trapezoidal panel 128 while extending diagonally through the side section 106 in parallelism with the score line 125, there is a front cut score line 129 which together with the score line 125 forms a diagonally extending trapezoidal panel 130.

Extending through the side section 103 diagonally with respect to the score line 127, there is a rear cut score line 131 which divides the space or area between the score line 127 and the upper end of the score line 101 into two panels 132 and 133.

Extending through the side section 106 diagonally with respect to the score line 129, there is a rear cut score line 134 which divides the space or area between the score line 129 and the upper end of the score line 102 into two panels 135 and 136. Extending through the center section 104, in parallelism with the score line 121, there is a front cut score line 145 which together with the upper sections of the score lines 101 and 102 and the edge section of the center section 104, define a panel 147, while the score lines 101 and 102, define a panel 148 which lies between the panels 122 and 147.

The outer end of the panel 109 has projecting therefrom, a locking tongue 137 while projecting from the outer end of the panel 110, there is a locking tongue 138. Similar locking tongues 139 and 140 project from the outer ends respectively of the panels 133 and 135. The outer end of each of the trapezoidal panels 118, 120, 128 and 130, extends beyond the end of the adjacent panels upon each side thereof to provide supporting tabs or extensions 141, the purpose of which will be hereinafter explained.

The element B' has a center panel 150 and upon the left hand side of the center panel 150, there are three panels 151, 153 and 155. Upon the right hand side of the center panel 150, there are three panels 152, 154 and 156. The panels 151, 153 and 155 are formed by rear cut score lines 157, 159 and 161 while the panels 152, 154 and 156 are formed by rear cut score lines 158, 160 and 162.

In its lower outer corner, the panel 155 is provided with an opening or slot 165 and the panel 156 is similarly provided in its lower outer corner with an opening or slot 166. The openings 165 and 166 receive respectively the locking tongues 137 and 138 when the two elements are set-up in display position. A slot 170 is provided in each of the score lines 159, 160, 161 and 162, the slots 170 in the scores lines 159 and 160 being in a higher plane in the set-up position of the elements than are their respective slots 170 in the score lines 161 and 162. There are four of these slots 170 and they are so related that when the elements are set-up in display position, they receive their respective supporting tabs 141 upon the ends of the several trapezoidal panels 118, 120, 128 and 130.

In the score line 157 in a plane above that of its respective slot 170, there is a slot 175 while in the score line 158 in a plane above that of its respective slot 170, there is a slot 176. These slots 175 and 176 receive respectively the locking tongues 139 and 140 of the panels 133 and 135 when the two elements are set-up in display position.

To set-up the display device as it is shown in Figure 6, the blanks are flexed about their several score lines, the several locking tongues 137, 138, 139 and 140 being engaged with their respective slots 165, 166, 175 and 176, the several supporting tabs 141, being engaged in their respective slots 170.

The engagement of the several locking tongues in their respective slots serve to secure the elements A' and B' together in their set-up position, in which position, the triangular panels 114, 116, 124, 126, 132 and 136 form a plurality of supporting shelves arranged in stepped horizontal planes receding from the center section 104, with the trapezoidal panels 118, 120, 128 and 130 occupying positions in vertical planes and forming supporting walls for the triangular supporting shelves.

In that form of the invention illustrated in Figures 11 to 16, inclusive, the devices comprise two members $A^2$ and $B^2$ which are adapted to be detachably secured together. As in the previously described forms of the invention, the member $A^2$ provides the article supporting member while the member $B^2$ retains the member $A^2$ in its operative position with the member $B^2$ forming a background therefor.

The blank from which the member $A^2$ is formed, is illustrated in plan view in Figure 16 and it comprises a main body portion having a central panel 200 which is defined on its side edges by two front cut score lines 201 and 202. Extending longitudinally of the blank in parallelism with its straight edge 203, there is a front cut score line 204 which extends throughout the length of the body portion of the blank. The panel 200, heretofore mentioned, is defined by the score lines 201, 202, 204 and the section designated 205 of the edge of the body portion of the blank.

The space between the score line 204 and parallel edge 203 of the body portion of the blank is divided into a plurality of panels 206, 207, 208, 209 and 210. The panel 206 is defined by a section of the score line 204, the crease score line 211, a front cut score line 212 and a section of the straight edge 203 of the blank. The panel 207 is defined by a section of the score line 204, the score line 212, a front cut score line 213, and a section of the straight edge 203 of the blank. The panel 208 is defined by a section of the score line 204, the score line 213, a front cut score line 214 and a section of the straight edge 203. The panel 209 is defined by the score line 214, a section of the score line 204, front cut score line 215 and a section of the straight edge 203. The panel 210 is defined by the score line 215, a section of the score line 204, a crease score line 216 and a section of the straight edge 203 of the blank.

The reference numeral 217 designates an extension projecting from the left end of the blank in Figure 16, while the reference character 218 designates an extension projecting from the right end of the blank in said figure. The extension 217 has a locking tongue 219 upon its free end and the extension 218 has a similar locking tongue 220 upon its free end.

Extending diagonally through the blank from the point where the score line 201 intersects the score line 204, there is a rear cut score line 221 which together with the score line 201 provides a triangular panel 222 upon the free end of which there is a locking tongue 223. Extending diagonally from that point where the score line 202 intersects the score line 204, there is a rear cut score line 224, which provides a triangular panel 225 upon the free end of which there is a locking tongue 226. Extending diagonally through the blank in parallelism with the score line 221 from that point where the score line 212 terminates on the score line 204, which point is designated 227, there is a front cut score line 228 which together with the score lines 204 and 221 provides a trapezoidal panel 229 in the blank. Extending diagonally through the blank in parallelism with the score line 224 and beginning at that point where the score line 215 terminates upon the score line 204, which point is designated 230, there is a front cut score line 231 which provides a trapezoidal panel 232. Extending diagonally through the blank in diverging relation with the score line 228, there is a rear cut score line 233 which together with the score line 228 provides a triangular panel 234 having a locking tongue 235 upon its free end. This score line 233 together with a section of the score line 204 and the free edges 236 and 237 of the blank, provides a trapezoidal panel 238 upon the left hand free end of the body portion of the blank in Figure 16. Extending through the blank from the point 230 in diverging relation with the score line 231, there is a rear cut score line 239 which together with the score line 231 provides a triangular panel 240 upon the outer end of which there is a locking tongue 241. This score line 239, together with a section of the score line 204 and the cut edges 242 and 243 of the blank provides a trapezoidal panel 244 upon the right hand free end of the body portion of the blank in Figure 16.

The element B², a section of which is shown in Figure 15, has a front cut score line 245 extending parallel with one edge thereof which edge forms the bottom edge of the element in display position. The score line 245 together with the free end 247 of the blank provides a panel 246 which forms a foot or support for the element B².

The element B² is provided with a plurality of vertically disposed slots 248, 249, 250, 251, 252 and 253, see Figure 11. The slots 248, 249 and 250 being disposed respectively in stepped planes with relation to each other upon the left hand side of the center of the blank in Figure 11, while the slots 251, 252 and 253 occupy positions in stepped planes upon the right hand side of the center line of the blank in Figure 11, the slot 253 being in the same plane as the slot 248; the slot 252 being in the same plane with the slot 249; and the slot 251 being in the same plane as the slot 250.

To set-up the device in display position, the element A² is flexed about the score lines 211, 212, 213, 214, 215 and 216 by drawing the panels 217 and 218 rearwardly. This action also flexes the blank upon the several sections of the score line 204 and the score lines 233, 228, 221, 201, 202, 224, 231 and 239. Upon thus flexing the blank, the triangular panels 233, 222, 225 and 240 will be thrown into a vertical plane as will also their respective locking tongues 235, 223, 226 and 241. The locking tongues will engage respectively in the slots 248, 249, 250, 251, 252 and 253 of the element B² to retain the element A² in its flexed condition. Positioning of the several triangular panels mentioned in the vertical plane, throws the two trapezoidal panels 238 and 244 in a horizontal or flat plane, the two trapezoidal panels 229 and 232 and the rectangular panel 200 occupying positions in inclined planes as illustrated in Figure 11.

From the foregoing it will be noted that this form of the invention provides a plurality of panels which recede in both inclined and horizontal planes from the front edge of the element A², which panels provide article supporting shelves.

In Figures 17 through 20, I have illustrated still another form of the invention in which there are two elements A³ and B³ detachably secured together in such a manner that the element B³ retains the element A³ in its set-up position and forms a background therefor.

In this form of the invention the element A³ is so constructed as to provide a plurality of triangular supporting shelves certain of which are horizontally disposed while others are inclined. Furthermore, in this form of the invention, all of the panels which form the supporting shelves and risers therefore, recede from a single point.

The blank from which the element A³ is formed is shown in plan view in Figure 20. This blank has a straight edge 270 and extending parallel with the straight edge 270, there is a front cut score line 271. Extending at right angles to the straight edge 270 and the score line 271, at a point intermediate the ends of said straight edge 270, there is a crease score line 272, and this crease score line 272 together with the straight edge 270 and the score line 271 provides two rectangular panels 273 and 274 which extend parallel with the straight edge 270 of the blank. Upon its free end, the panel 273, has a locking tongue 275 and the panel 274 is provided with a similar locking tongue 276 upon its free end.

The point where the inner end of the score line 272 meets the score line 271 is designated 277 and extending diagonally from said point through the left hand section of the blank there is a rear cut score line 278 which together with the left hand section of the score line 271, provides a triangular panel 279. A front cut score line 280 extends diagonally from the afore-mentioned point 277 in diverging relation with respect to the score line 278, and this score line 280 together with the score line 278 provides a triangular panel 281, upon the outer free end of which there is a locking tongue 282. Extending diagonally through the blank from the point 277 in diverging relation with respect to the score line 280, there is a rear cut score line 283 which together with the score line 280 provides a triangular panel 284. Extending diagonally through the blank in diverging relation with respect to the score line 283, there is a front cut score line 285 which together with the score line 283 provides a panel 286 upon the outer free end of which there is a locking tongue 287. Extending diagonally through the blank upon the right hand side of the center thereof, there is a front cut score line 288, these score lines 285 and 288 diverge with respect to each other to form an intermediate panel 289. Extending diagonally upon the same side of the blank from the point 277, there is a rear cut score line 290 which together with the score line 288 provides a triangular panel 291 upon the outer free end of which there is a locking tongue 292. Extending diagonally through the blank in diverging relation with the score line 290 and originating at the point 277, there is a front cut score line 293 which together with the score line 290 provides a triangular panel 294. Extending diagonally through the blank in diverging relation with respect to the score line 293, there is a rear cut score line 295 which together with the score line 293 provides a triangular panel 296 upon the free outer end of which there is a locking tongue 297. The score line 295 together with the score line 271, and the section 298 of the free edge of the blank provides a triangular panel 299.

The element B³ is divided into a central panel 300 by rear cut score line 301 and 302. Upon the left hand side of the central panel 300, there are two panels 303 and 304, these panels being formed by a rear cut score line 305 which together with the score line 301 forms the side edges of the panel 304 and a front cut score line 306 which together with the score line 305 forms the side edges of the panel 303. The reference character 307 designates a latterly extending panel or wing. Upon the right hand side of the central panel 300, there are two panels 308 and 309, the score line 302 and a rear cut score line 310 forming the side edges of the panel 308 with the score line 310 and a front cut score line 311 forming the side edges of the panel 309. The reference character 312 designates a side panel or wing projecting latterly from the panel 309.

The element B³ has a vertical slot 313 in the score line 306 on the left side thereof and a vertical slot 314 in the score line 311 on the right side thereof. In the score line 305 in a plane above the slot 313 there is a slot 315 and in the score line 310 in the same horizontal plane as the slot 315, there is a slot 316. In the score line 301, in a higher plane than that of the slot 315, there is a vertical slot 317 and in the score line 302 and in the same plane as the slot 317, there is a vertical slot 318.

In setting up this form of the invention, the blank from which the element A³ is formed, is flexed to fold it upon the several score lines. Upon flexing of the blank, the alternate triangular panels are arranged alternately in horizontal and vertical planes, the panels 273 and 274 forming risers for the panels 279 and 299; the panels 281 and 296 forming risers for the panels 284 and 294 while the panels 286 and 291 form risers for the panel 289. With the blank A³ in its flexed condition, the several locking tongues 275, 276, 282, 297, 287 and 292 will engage respectively in the vertical slots 313, 314, 315, 316, 317 and 318. Interlocking engagement of these several locking tongues with their respective slots retain the two elements in the set-up position in which they are shown in Figure 17, with the panels 279 and 299 forming the supporting shelves in a horizontal plane while the panels 284, 289 and 294 form article supporting shelves in inclined planes with all of said panels, both those forming the supporting shelves and the ones forming risers therefor, receding in diverging relation from the point 277 on the blank.

From the foregoing, it will be apparent that the present invention provides a new and improved display device which includes a plurality of receding supporting elements in stepped planes, which device is capable of being set-up in display position and knocked-down at will without danger of damage to the device. Furthermore, it will be apparent that the invention provides a device in which the operation of setting it up in display position is a simple one which may be accomplished without the use of special tools or devices.

Having thus described the invention, what is claimed as new is:

1. A display device including a flat blank having a continuous score line extending therethrough and forming the forward edge of the finished display, score lines extending from said first mentioned score line through said blank and dividing it into a plurality of hingedly connected panels, said blank being circumflexed upon said score lines to throw the first mentioned score line and the panels in receding relation, and means for retaining the blank in its circumflexed form.

2. A display element comprising a flat blank of flexible material, a score line extending through said blank and forming a forward edge of the finished display, score lines extending through said blank and emanating from said first mentioned score line and dividing the blank into a plurality of hingedly connected panels which extend angularly from the first mentioned score line, said blank being circumflexed upon said score lines to throw the first mentioned score line and the panels in receding relation, and means for retaining the blank in its circumflexed form.

3. A display element comprising a flat blank of foldable material, a score line extending through said blank and forming a forward edge of the finished display, score lines extending through said blank and emanating from said first mentioned score line and serving therewith to divide the blank into a plurality of alternately disposed hingedly connected triangular and trapezoidal panels which extend angularly from said first mentioned score line, said blank being flexed upon said score lines to throw the first mentioned score line and the panels in receding relation with the adjacent panels in alternate horizontal and vertical planes, and means for retaining the blank in its flexed form.

4. A display element comprising a flat blank of foldable material, a score line extending through said blank and forming a forward edge of the finished display, score lines extending through said blank and emanating from said first mentioned score line and serving therewith to divide the blank into a plurality of alternately disposed hingedly connected triangular and trapezoidal panels which extend angularly from said first mentioned score line, said blank being flexed upon said score lines to throw the first mentioned score line and said panels in receding relation with the triangular panels and trapezoidal panels respectively in horizontal and vertical planes, and means for retaining the blank in its flexed form.

5. A display device including an element consisting of a flat blank of foldable material, score lines extending through the blank and dividing said blank into a plurality of hingedly connected sections, and other score lines dividing certain of said sections into a plurality of angularly related hingedly connected panels, the panels in each section having a complementary panel in the other section, said blank being flexed upon its score lines to throw the adjacent panels in each section into alternate horizontal and vertical planes, and means for retaining said blank in its flexed position.

6. A display device including an element consisting of a flat blank of foldable material, a score line extending through the blank and dividing said blank into a plurality of substantially equal hingedly connected sections, score lines extending through each of said sections and dividing them into a plurality of angularly related hingedly connected panels, the panels in each section having a complementary panel in the other section, said blank being flexed upon its score lines to throw the adjacent panels in each section into alternate horizontal and vertical planes, and means for retaining said blank in its flexed position.

7. A display element comprising a flat blank of foldable material, a plurality of continuous parallel score lines extending through said blank and dividing the blank into a central section and a side section on each side thereof, score lines connecting said parallel score lines at spaced intervals and dividing the central section into a plurality of hingedly connected panels, score lines extending angularly through each of said side sections, said last mentioned score lines emanating from their respective first mentioned parallel score lines and serving to divide their respective sections into alternately disposed triangular and trapezoidal panels, said blank being flexed upon said score lines to throw the central section of the blank and said panels in receding relation, and means for retaining said blank in its flexed form.

8. A display element comprising a flat blank of foldable material, a plurality of continuous parallel score lines extending through said blank and dividing the blank into a central section and a side section on each side thereof, score lines connecting said parallel score lines at spaced intervals and dividing the central section into a plurality of hingedly connected panels, score lines extending through each of said side sections, said last mentioned score lines emanating from their respective first mentioned parallel score lines and serving to divide their respective sections into a plurality of hingedly connected panels, said blank being flexed upon said score lines to throw the central section of the blank and the panels in each side section in receding relation with the panels in each side section in alternate horizontal and vertical planes, and means for retaining the blank in its flexed form.

9. A display element comprising a flat blank of foldable material, a continuous score line extending through said blank in spaced relation to one edge thereof, a second score line extending from said first mentioned score line to the adjacent edge of the blank, and a plurality of score lines extending from a common point on said first mentioned score line and dividing the blank into a plurality of triangular panels, said blank being flexed upon said score lines to throw said triangular panels in receding relation with respect to the said common point on the first mentioned score line, and means for retaining said blank in its flexed form.

10. A display element comprising a flat uncut blank having no incisions in its marginal edge which effect the folding of the blank, a plurality of score lines extending from a common point adjacent one edge of said blank and dividing said blank into a plurality of hingedly connected panels, said blank being circumflexed upon said score lines to throw said panels and said score lines into receding relation with the common point at which the score lines meet, and means for retaining said blank in its circumflexed form.

11. A display element comprising a flat blank having a straight edge, a score line extending continuously through said blank in spaced parallel relation with said straight edge, a second score line extending from the straight edge of the blank and terminating at said first mentioned score line, and a plurality of score lines extending through the blank from that point of juncture of the first and second score lines, said plurality of score lines dividing said blank into a plurality of hingedly connected triangular panels, said blank being flexed upon said score lines to throw said panels into alternate horizontal and vertical planes and in receding relation with respect to the point of juncture of the first and second mentioned score lines, and means for retaining said blank in its flexed form.

12. A display element comprising a flat blank having a straight edge, a score line extending continuously through said blank in spaced parallel relation with said straight edge, a second score line extending from the straight edge of the blank and terminating at said first mentioned score line, and a plurality of score lines extending through the blank from that point of juncture of the first and second score lines, said plurality of score lines dividing said blank into a central triangular panel and a plurality of triangular panels upon each side thereof, said blank being flexed to throw all of said triangular panels into receding relation to the point of juncture of the first and second mentioned score lines, and means for retaining the blank in its flexed form.

13. A display device including a flat blank having a continuous score line extending therethrough and forming a forward upright and receding edge of the finished display, score lines extending from said first mentioned score line through said blank and dividing it into a plurality of hingedly connected panels, said blank being circumflexed upon said score lines to throw the first mentioned score line into an upright and receding position and the said panels in receding relation thereto, and means for retaining the blank in its circumflexed form.

14. A display device comprising a blank of foldable material, a score line extending through the blank in one direction, a second score line extending from one side of said score line in angular relation thereto, and a plurality of score lines extending from the opposite side of the first mentioned score line in diverging relation from the point of intersection of the first and second mentioned score lines to divide the blank into a plurality of hingedly connected panels movable into angularly related planes upon circumflexion of the blank and means for retaining the blank in circumflexed form.

RICHARD EATON PAIGE.